(12) United States Patent
Nemoto et al.

(10) Patent No.: US 9,102,184 B2
(45) Date of Patent: Aug. 11, 2015

(54) INDIRECT TRANSFER MEDIUM AND FORGERY PREVENTION MEDIUM PRODUCING APPARATUS

(71) Applicant: Kabushiki Kaisha Toshiba, Tokyo (JP)

(72) Inventors: Nobuki Nemoto, Yokohama (JP); Katsumi Motegi, Yokohama (JP); Takeo Miki, Machida (JP); Fumitoshi Morimoto, Shirakawa (JP); Takahisa Nakano, Kawasaki (JP); Shota Kure, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/020,072

(22) Filed: Sep. 6, 2013

(65) Prior Publication Data

US 2014/0072734 A1    Mar. 13, 2014

(30) Foreign Application Priority Data

Sep. 7, 2012   (JP) .................. 2012-197859

(51) Int. Cl.
| | |
|---|---|
| *B41M 3/14* | (2006.01) |
| *B41M 5/52* | (2006.01) |
| *B42D 25/405* | (2014.01) |
| *B42D 25/47* | (2014.01) |
| *B32B 37/00* | (2006.01) |
| *B44C 1/17* | (2006.01) |
| *B32B 38/00* | (2006.01) |
| *B42D 25/00* | (2014.01) |

(52) U.S. Cl.
CPC .......... *B41M 5/5254* (2013.01); *B32B 37/0046* (2013.01); *B41M 5/5272* (2013.01); *B42D 25/405* (2014.10); *B44C 1/1716* (2013.01); *B32B 37/025* (2013.01); *B32B 38/145* (2013.01); *B32B 2309/02* (2013.01); *B32B 2309/04* (2013.01); *B32B 2309/105* (2013.01); *B32B 2425/00* (2013.01); *B41M 2205/10* (2013.01); *B42D 25/00* (2014.10); *B42D 25/47* (2014.10); *B42D 2033/04* (2013.01)

(58) Field of Classification Search
CPC ........ B41M 5/14; B41M 5/52; B41M 5/5254; B41M 5/5272; B41M 2205/10; B41M 3/14; B42D 25/405; B42D 25/47
USPC .................. 428/32.12, 32.28, 32.38
See application file for complete search history.

(56) References Cited

U.S. PATENT DOCUMENTS 5,677,067 A * 10/1997 Kojima et al. ............. 428/32.27
8,105,665 B2 * 1/2012 Kaimoto .................... 428/32.21

(Continued)

FOREIGN PATENT DOCUMENTS

| EP | 0618080 A2 | 10/1994 |
|---|---|---|
| JP | 2001-105736 A | 4/2001 |

(Continued)

OTHER PUBLICATIONS

Office Action issued in related Korean Patent Application No. 10-2013-0095771 mailed Nov. 3, 2014, 4 pages.

(Continued)

*Primary Examiner* — Bruce H Hess
(74) *Attorney, Agent, or Firm* — Baker Botts L.L.P.

(57) ABSTRACT

According to one embodiment, an indirect transfer medium includes: a base material; and an image receiving layer on which an image is capable of being formed by ink-jet printing. The image receiving layer includes a vinyl acetate maleate copolymer as thermo-adhesive material. The image receiving layer is laminated on the base material.

9 Claims, 8 Drawing Sheets

(56) References Cited

U.S. PATENT DOCUMENTS

| | | |
|---|---|---|
| 2006/0147657 A1* | 7/2006 | Loeb .................... 428/32.1 |
| 2009/0246380 A1 | 10/2009 | Kaimoto |

FOREIGN PATENT DOCUMENTS

| | | |
|---|---|---|
| JP | 2002356053 A | 12/2002 |
| JP | 2003-054113 | 2/2003 |
| JP | 2005-161811 | 6/2005 |
| JP | 2005-246860 | 9/2005 |
| JP | 2007001203 A | 1/2007 |
| KR | 20-0406479 Y1 | 1/2006 |

OTHER PUBLICATIONS

Partial EPO Search Report, issued in EP Application No. 13183121.6, mailed Oct. 16, 2013, 5 pages.

Decision of Grant issued in related Korean Patent Application No. Oct. 2013-0095771 mailed Feb. 27, 2015, 2 pp.

* cited by examiner

INDIRECT TRANSFER MEDIUM AND FORGERY PREVENTION MEDIUM PRODUCING APPARATUS

CROSS-REFERENCE TO RELATED APPLICATION

This application is based upon and claims the benefit of priority from Japanese Patent Application No. 2012-197859, filed on Sep. 7, 2012; the entire contents of which are incorporated herein by reference.

FIELD

Embodiments described herein relate generally to an indirect transfer medium and a forgery prevention medium producing apparatus.

BACKGROUND

Printing made on a fibrous medium such as paper with an ink-jet printer has the following drawbacks.

(1) Ink bleeds along fibers, and thus high image quality is not achieved.

(2) When water or a chemical adheres to the paper after printing, ink dye or ink pigment is removed from the paper and thus printed records are not preserved.

In order to address the drawback (1), paper coated with resin or the like for preventing the ink from bleeding to improve image quality, i.e., ink-jet printing paper, is widely used.

In order to address the drawback (2), in addition to the aforementioned technique, there has been proposed: a technique to add a cationic resin or the like to include a component for fixing dye and pigment onto the paper; and a technique to adhere a protective film onto the printed paper so that water or chemical does not make contact with ink components.

Furthermore, as a technique to address the drawbacks (1) and (2), there has been known an indirect transfer method for providing the bonding surface of a protective film, which is usually adhered onto paper after printing, with a high-quality image printing capability. Then, according to the indirect transfer method, the bonding surface is adhered onto a target medium after the printing is performed on the protective film.

However, there are a limited number of examples of indirect transfer methods for ink-jet printing, and also, known examples of indirect transfer media are often limited to use in iron-on transfer sheets and ID cards, for example. Therefore, there has not been proposed an indirect transfer method with high image quality, high durability, and high production efficiency, and that can be used for official documents and the like.

DETAILED DESCRIPTION

In general, according to one embodiment, an indirect transfer medium comprises: a base material; and an image receiving layer on which an image is capable of being formed by ink-jet printing. The image receiving layer includes a vinyl acetate maleate copolymer as thermo-adhesive material. The image receiving layer is laminated on the base material (11).

Exemplary embodiments will be described with reference to the accompanying drawings.

First Embodiment

Figure 1:
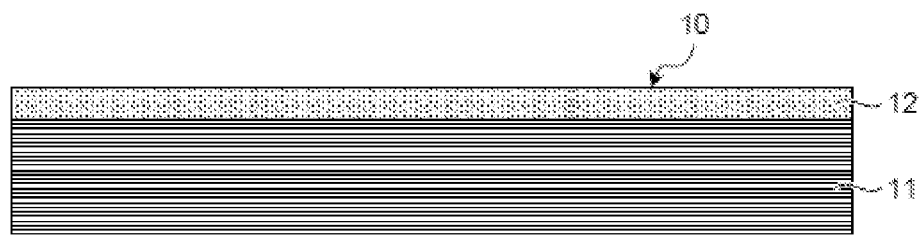
FIG. 1 is a schematic cross-sectional view illustrating a configuration of an ink-jet recording transfer medium according to a first embodiment.

FIG. 1 is a schematic cross-sectional view illustrating a configuration of an ink-jet recording transfer medium according to a first embodiment.

An ink-jet recording transfer medium (hereinafter referred to as an indirect transfer medium) 10 roughly includes a base material 11, and an ink-image receiving layer 12 laminated on the base material 11.

The base material 11 serves as an overcoat layer (protective film) when the base material 11 is transferred onto a transfer target medium (transferred medium) such as paper.

The base material 11 is formed of hydrophobic materials such as an ultraviolet curable resin, a polyester resin, and polyethylene terephthalate. The base material 11 has optical transparency, and heat resistance strong enough to tolerate thermal transfer.

Consequently, the base material 11 serves as an overcoat layer, and ensures the fastness of printed records after thermal transfer.

The ink-image receiving layer 12 develops adherence property with respect to the transfer target medium by heating. The layer thickness thereof is designed to be 5 to 30 μm.

The ink-image receiving layer 12 contains a water-absorbent resin, a cationic resin, and a thermoplastic resin. As the water-absorbent resin, a modified polyester is used for example. As the cationic resin, a cationic vinyl compound is used for example. As the thermoplastic resin, a vinyl acetate maleate copolymer is used.

The following describes the compounding ratios of the respective resins in the ink-image receiving layer 12 when a modified polyester is used as the water-absorbent resin, a cationic vinyl compound is used as the cationic resin, and a vinyl acetate maleate copolymer is used as the thermoplastic resin.

In this case, an important factor for determining the properties of the ink-image receiving layer 12 is the compounding ratio of the vinyl acetate maleate copolymer as the thermoplastic resin.

In the first embodiment, the compounding ratio of the vinyl acetate maleate copolymer is set to be 10% to 40% by weight.

The reason for the compounding ratio of the vinyl acetate maleate copolymer to be set to equal to or greater than 10% by weight is that, when the compounding ratio is below 10% by weight, an amount of thermoplastic resin is so small that it can degrade adherence property with respect to the base material 11.

Figure 2:
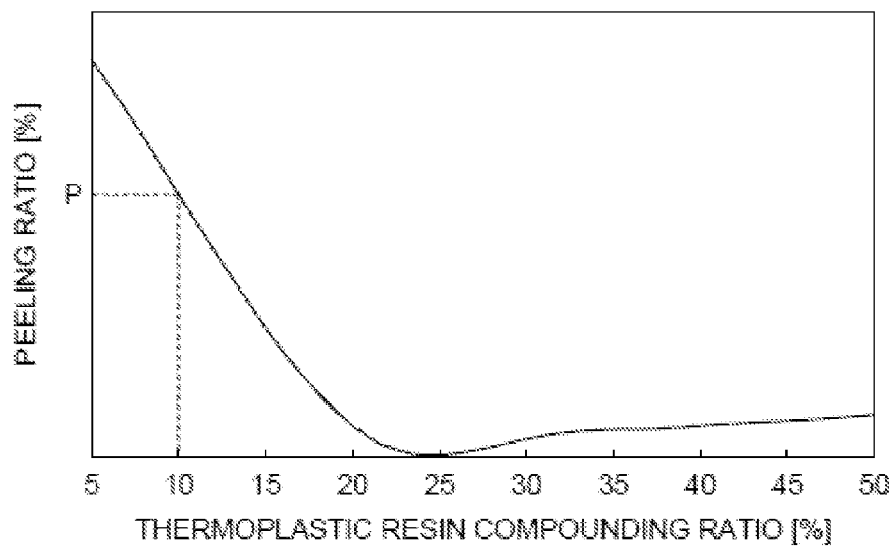
FIG. 2 is a graph for explaining a relationship, which is used in determining the compounding ratio of the vinyl acetate maleate copolymer, between a peeling ratio (%) of a base material serving as an overcoat layer and a compounding ratio of a vinyl acetate maleate copolymer, which is a thermoplastic resin, in the first embodiment.

FIG. 2 is a graph for explaining a relationship between a peeling ratio (%) of a base material serving as an overcoat layer and a compounding ratio of a vinyl acetate maleate copolymer, which is a thermoplastic resin. This relationship is used for determining the compounding ratio of the vinyl acetate maleate copolymer.

When a peeling ratio acceptable for practical use, which was determined based on experiments, is taken to be P %, the compounding ratio of the vinyl acetate maleate copolymer having the peeling ratio of less than or equal to P % is greater than or equal to 10% by weight.

Meanwhile, the reason for the compounding ratio of the vinyl acetate maleate copolymer to be set to less than or equal to 40% by weight is that adhesive strength with respect to paper, which is assumed as a transfer target medium, lowers when the compounding ratio exceeds 40% by weight. Furthermore, because the vinyl acetate maleate copolymer, which is a thermoplastic resin, has fluidity during thermal transfer, printing may be smeared when the compounding ratio of the vinyl acetate maleate copolymer is too high.

As a consequence, the compounding ratio of the vinyl acetate maleate copolymer being set to 10% to 40% by weight ensures adhesive strength with respect to the base material 11 and paper, which is assumed as a transfer target medium. This further allows the printing quality to remain at a high quality level.

The second important factor for determining the properties of the ink-image receiving layer 12 is the compounding ratio of the cationic vinyl compound as a cationic resin.

In the first embodiment, the compounding ratio of the cationic vinyl compound is set to be 5% to 10% by weight.

The reason for the compounding ratio of the cationic vinyl compound to be set to greater than or equal to 5% by weight is that, when the compounding ratio is below 5% by weight, the retentive strength of anionic aqueous ink used in ink-jet printing lowers and thus the quality of an image formed lowers.

Meanwhile, the reason for the compounding ratio of the cationic vinyl compound to be set to less than or equal to 10% by weight is that, when the compounding ratio exceeds 10% by weight, cohesion occurs during the mixing of materials constituting the ink-image receiving layer 12 and thus homogeneously mixed materials cannot be obtained.

The compounding ratio of the modified polyester as a water-absorbent resin is adjusted, after the compounding ratio of the vinyl acetate maleate copolymer and the compounding ratio of the cationic vinyl compound are determined, to be 100% by weight as a whole including some additives (for example, dispersant, antifoaming agent, and surfactant). As a result, in the first embodiment, the compounding ratio of the modified polyester is set to be 55% to 80% by weight.

With the ink-image receiving layer 12 in the first embodiment, an aqueous ink used in ink-jet printing turns into a dry condition in 0.42 seconds per 1 pl (picoliter) thereof. The dry condition here means that, unless otherwise noted, ink is not transferred onto another medium such as copying paper or a SUS plate when the other medium is pressed against an image formed portion (printed portion) with a loading of 70 g/cm².

With the ink-image receiving layer 12 in the first embodiment, the diameter (micrometers) of an image dot formed with an aqueous ink used for ink-jet printing can be controlled to a value obtained by the following Equation (1) using the volume of ink (picoliters):

$$D = 12 \sim 14 \times V^{\frac{2}{3}}. \qquad (1)$$

The value D represented by Equation (1) is about 25 μm for an image dot of an image formed (printed) with 3 pl of ink, and about 42 μm for an image dot of an image formed (printed) with 6 pl of ink.

The ink-image receiving layer 12 in the first embodiment is designed such that the roundness of dots formed is less than or equal to 10% of the average radius of the dots.

Figure 3:
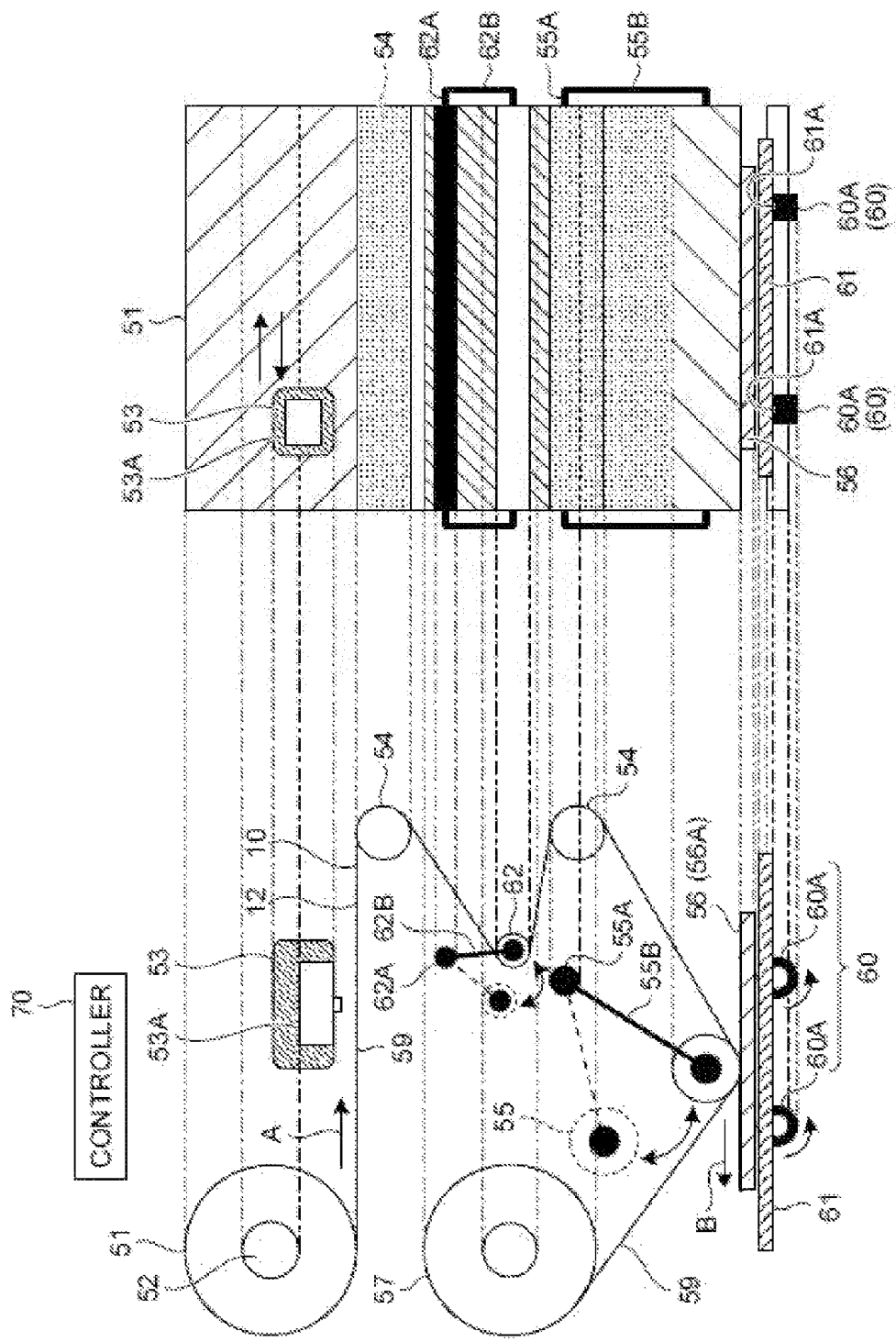
FIG. 3 is a schematic diagram illustrating the configuration of an ink-jet forgery prevention medium producing apparatus in the first embodiment.

FIG. 3 is a schematic diagram illustrating a configuration of an ink-jet forgery prevention medium producing apparatus.

A view on a left hand side of FIG. 3 is a side view of a conveyance system of the forgery prevention medium producing apparatus.

A view on a right hand side of FIG. 3 is a front view of the conveyance system of the forgery prevention medium producing apparatus.

A forgery prevention medium producing apparatus 50 includes: an indirect transfer medium roll 51 in which the indirect transfer medium 10 laminated on a conveying-base material 59 in a long sheet form is wound around an indirect transfer medium roller 52 in a roll form; and an ink-jet printing unit 53 that serves as an ink-jet image forming unit and forms an ink-jet printed image on the indirect transfer medium 10.

The forgery prevention medium producing apparatus 50 further includes: a plurality of indirect transfer medium conveying shafts 54 serving as a first conveying unit that conveys the indirect transfer medium 10 together with the conveying-base material 59 as a whole in the arrow A direction in the view on the left hand side of FIG. 3; a tension control shaft 62 that maintains the tension (tensile force) of the indirect transfer medium 10 at constant during conveyance through rotation of a rotating arm 62B around a rotational shaft 62A as the center of rotation by a drive mechanism not illustrated; and a heat roller (thermal transfer roller) 55 that performs thermal transfer of the indirect transfer medium 10 onto a transfer target medium 56.

The forgery prevention medium producing apparatus 50 further includes: a base-material collecting roll 57 that winds up and collects the conveying-base material 59 after the transfer; a transfer-target medium conveying unit 60 that includes a thermocompression-bonding smoothing plate 61 formed with roller holes 61A through which respective parts of a plurality of conveying rollers 60A are projected on the upper surface side and that serves as a second conveying unit conveying the transfer target medium 56 as a transfer target medium in the arrow B direction, and a controller 70 that controls the whole forgery prevention medium producing apparatus 50.

In the above-described configuration, the ink-jet printing unit 53 has an ink-jet head 53A, and the ink-jet printing unit 53 is driven by a scanning motor not illustrated, which is driven under the control of the controller 70. The ink-jet printing unit 53 is integrally scanned with the ink-jet head 53A in the sub-scanning direction (left-right direction in FIG. 3B) orthogonal to the main-scanning direction, which is the conveying direction of the indirect transfer medium 10, along an operation guide shaft not illustrated.

The heat roller 55 includes a rotating arm 55B to rotate around a rotational shaft 55A as the center of rotation. When transfer operation is not performed, the heat roller 55 separates the conveying-base material 59 from the transfer target medium 56 through the rotating arm 55B.

The tension control shaft 62 includes the rotating arm 62B to rotate around the rotational shaft 62A as the center of rotation.

Next, the operation of the forgery prevention medium producing apparatus 50 will be described.

Figure 4:
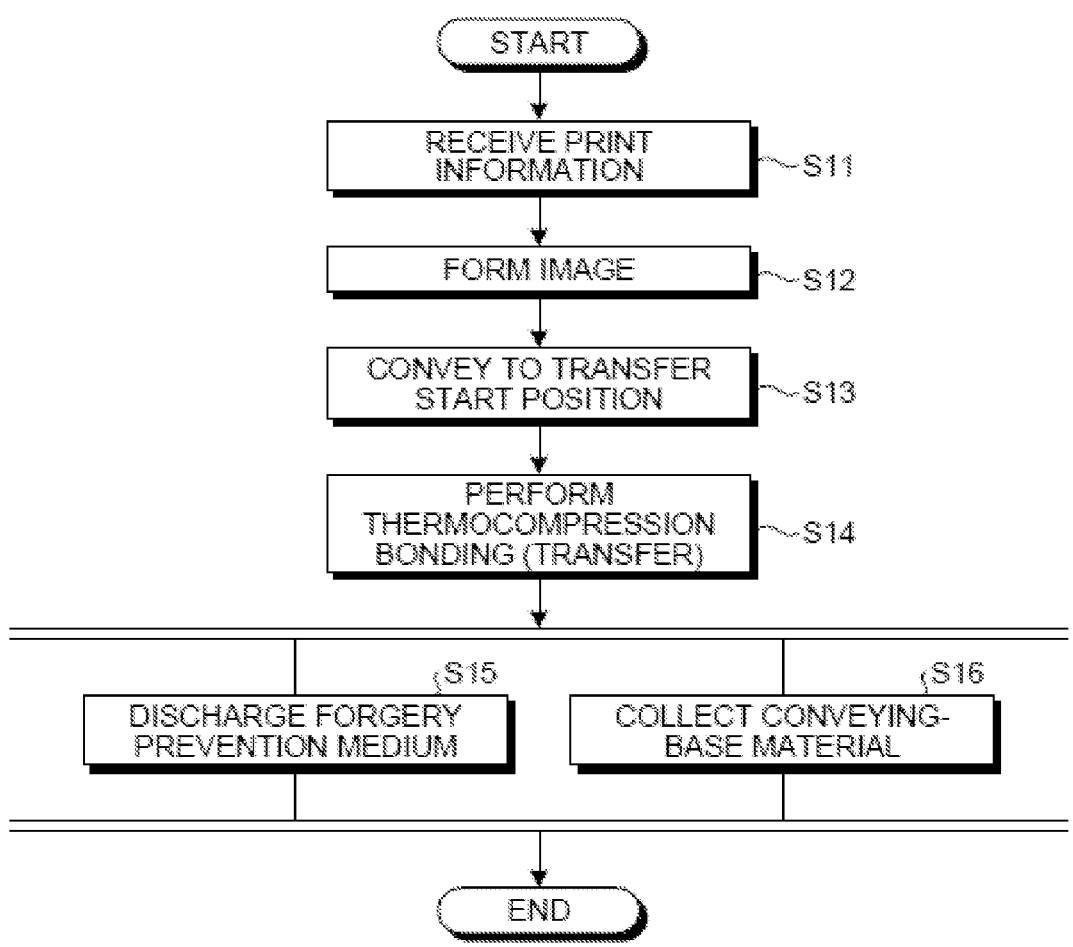
FIG. 4 is a flowchart of an operation of the forgery prevention medium producing apparatus in the first embodiment.

FIG. 4 is a flowchart of an operation of the forgery prevention medium producing apparatus.

Upon receiving print information via a connector or a network not illustrated (S11), the controller 70 rotates the base-material collecting roll 57 to draw out the indirect transfer medium 10 from the indirect transfer medium roll 51. In synchronization with of the drawing out of the indirect transfer medium 10, the ink-jet printing unit 53 performs scanning to form an image corresponding to the print information received, on the indirect transfer medium 10 (S12).

Figure 5:
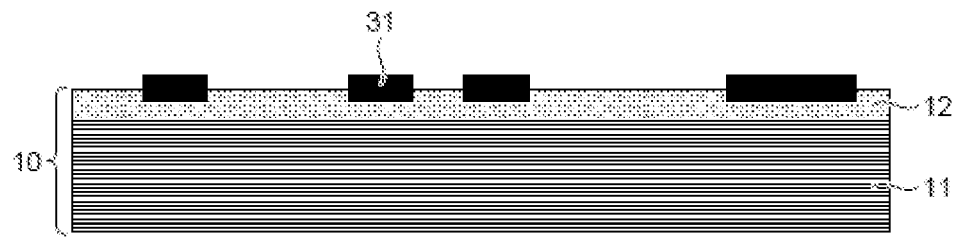
FIG. 5 is a diagram for explaining an image forming state in the first embodiment.

FIG. 5 is a diagram for explaining an image forming state.

The controller 70 forms (prints) an image with the ink-jet printing unit 53 while maintaining the tension of the indirect transfer medium 10 constant using the indirect transfer medium conveying shafts 54 and the tension control shaft 62.

Consequently, as illustrated in FIG. 5, the image is formed with ink supplied by the ink-jet printing unit 53 on the ink-image receiving layer 12 of the indirect transfer medium 10 and is retained thereon.

The controller 70 subsequently rotates the conveying rollers 60A of the transfer-target medium conveying unit 60, and causes the transfer target medium 56 in a sheet form or a booklet form (for example, a passbook and a passport) to move up to and stop at a transfer start position (S13).

The controller 70 then conveys the indirect transfer medium 10, on which printing has been finished, via the indirect transfer medium conveying shafts 54 until a printed portion reaches the transfer start position, and stops the indirect transfer medium 10. In this case, the time duration until when the image formed on the indirect transfer medium 10 (image forming surface) is made in contact with other members including the tension control shaft 62 is set to be greater than or equal to 10 seconds and less than or equal to 30 seconds, and is controlled such that the dry condition is met before the indirect transfer medium 10 makes contact with other members including the tension control shaft 62.

Figure 6:
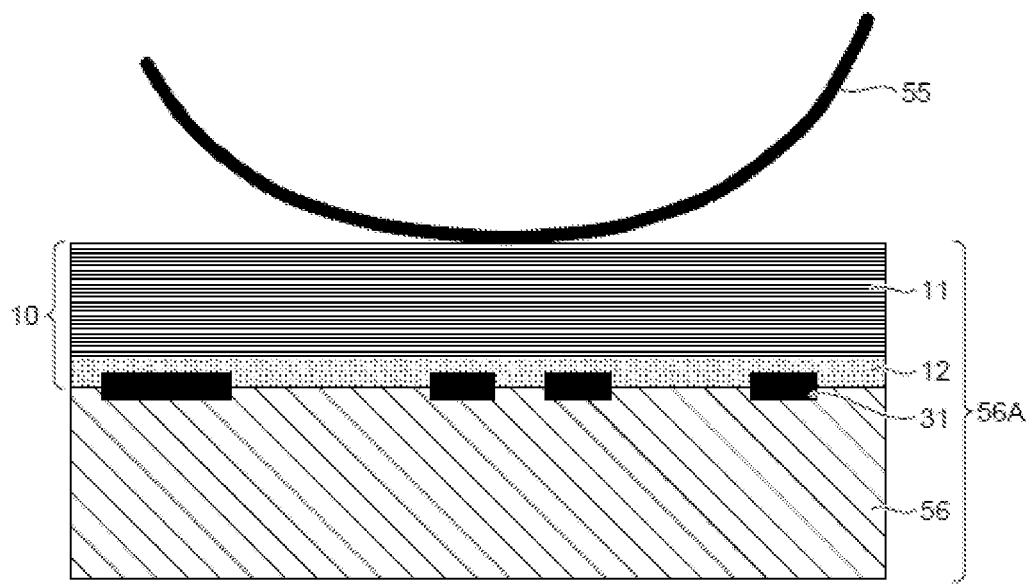
FIG. 6 is a diagram for explaining the transfer of an indirect transfer medium and the operation during the transfer in the first embodiment.

FIG. 6 is a diagram for explaining the transfer of the indirect transfer medium, and the operation during the transfer in the first embodiment.

The controller 70 next heats up the heat roller 55. The controller 70 then rotates the rotating arm 55B around the rotational shaft 55A as the center of rotation with the drive mechanism not depicted, to move the heat roller 55 such that the indirect transfer medium 10 is pressed against the transfer target medium 56 by the heat roller 55.

Under the condition of the indirect transfer medium 10 being pressed against the transfer target medium 56 by the heat roller 55, the controller 70 rotates the conveying rollers 60A of the transfer-target medium conveying unit 60 to add heat (100 to 180° C.) by the heat roller 55 to the whole transfer target area. As a result, as illustrated in FIG. 6, the indirect transfer medium 10 is transferred onto the transfer target medium 56 (S14).

The controller 70 then further rotates the conveying rollers 60A of the transfer-target medium conveying unit 60. Upon rotation of the conveying rollers 60A, the controller 70 stops the rotation of the indirect transfer medium roll 51 and the base-material collecting roll 57. Consequently, the controller 70 discharges a forgery prevention medium 56A while peeling off the conveying-base material 59 that conveys the indirect transfer medium 10 (S15).

The controller 70 then rotates the base-material collecting roll 57 to collect the conveying-base material 59 after the transfer and peel-off (S16).

The above-described process produces the forgery prevention proof medium 56A with the indirect transfer medium 10 transferred onto the transfer target surface thereof.

As in the foregoing, the indirect transfer medium 10 in the first embodiment enables forming of an image of high image quality without ink bleeding along fibers even when printing is performed by ink-jet printing.

Furthermore, because the indirect transfer medium 10 is fast-dry, the forgery prevention medium 56A is produced at low cost and in a short period of time even when an ink-jet printer and a transfer device that performs transfer are integrally configured as a forgery prevention medium producing apparatus.

Moreover, the forgery prevention medium 56A obtained by transferring (thermocompression bonding) the indirect transfer medium 10 onto the transfer target medium 56 has superior image quality, and because the surface thereof is covered with the base material 11 as an overcoat, the forgery-proof medium 56A has durability.

Second Embodiment

An indirect transfer medium according to a second embodiment will be described.

The indirect transfer medium in the second embodiment is an embodiment in which a functional layer with a predetermined function is provided between the base material and the ink-image receiving layer of the first embodiment.

Figure 7:
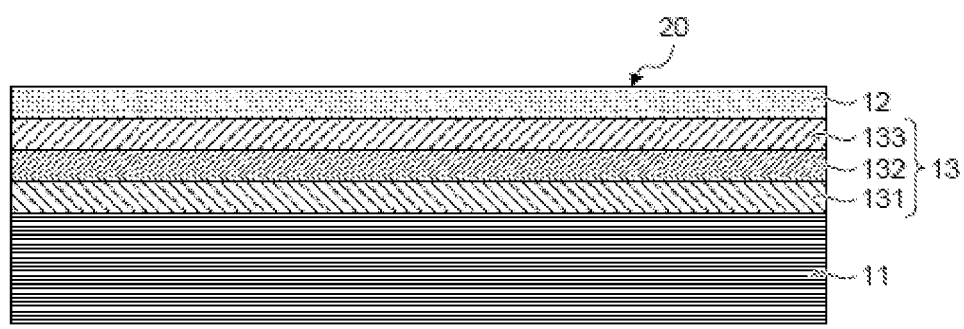
FIG. 7 is a schematic cross-sectional view illustrating a configuration of an indirect transfer medium according to a second embodiment.

FIG. 7 is a schematic cross-sectional view illustrating a configuration of the indirect transfer medium in the second embodiment.

An indirect transfer medium 20 in the second embodiment includes a functional layer 13 provided between the base material 11 and the ink-image receiving layer 12 of the indirect transfer medium 10 of the first embodiment.

In the second embodiment, a peel-off layer 131, a protective layer 132, and an optical layer 133 are used as the functional layer 13. However, the configuration of the functional layer is not restricted to the configuration in the second embodiment, and can be changed as necessary.

In the following, the indirect transfer medium 20 of the second embodiment is explained with reference to FIGS. 1 and 7.

In the second embodiment, the functional layer 13 with a desired function provided between the ink-image receiving layer 12 and the base material 11 improves convenience in transfer and enables addition of function, which cannot be achieved by simply performing the thermal transfer of printed records onto other media.

In an example of FIG. 7, the peel-off layer 131, the protective layer 132, the optical layer 133, and the ink-image receiving layer 12 are laminated on the base material 11 in the foregoing order. Thus, selectively applying heat to a specific position of the indirect transfer medium 20 allows only a part thereof to be adhered to a transfer target medium (transferred medium), and allows the peel-off layer 131 and the protective layer 132 to be peeled off.

As a consequence, when the indirect transfer medium 20 is formed in a roll form, printing and transferring can be performed continuously.

Furthermore, the protective layer 132 bonded to a forgery prevention medium via the ink-image receiving layer 12 allows the fastness of printed records after bonding to be retained.

Moreover, because the optical layer 133 is laminated between the protective layer 132 and the ink-image receiving layer 12, information by printing, hologram, or the like can be recorded together. The indirect transfer medium 20 in the second embodiment thus enables production of printed records that cannot be duplicated easily.

The base material 11, however, is not necessary to have the function of an overcoat layer. Thus, the base material 11 may not need to have optical transparency. More specifically, the base material 11 only needs to have the function that allows the ink-image receiving layer 12 and the functional layer 13 to be retained until the thermal transfer to the transfer target medium (for example, paper) is performed.

As for the configuration of the functional layer 13, it is not limited to have only the peel-off layer 131, the protective layer 132, and the optical layer 133, but it is possible to omit a part of the layers or to laminate a additional layer having another function as necessary.

Next, with reference to FIG. 3 again, the production of a forgery prevention medium using the indirect transfer medium 20 in the second embodiment will be described.

Figure 8:
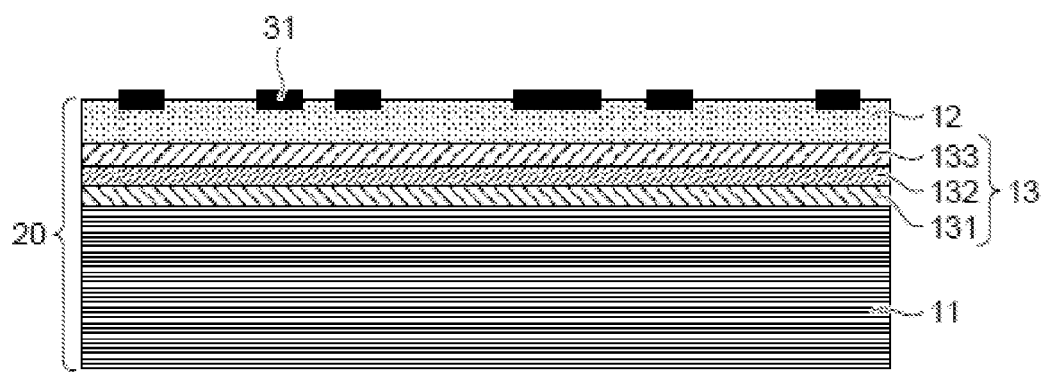
FIG. 8 is a diagram for explaining an image forming state in the second embodiment.

FIG. 8 is a diagram for explaining an image forming state.

The controller 70 of the forgery prevention medium producing apparatus 50 illustrated in the view on the left hand side of FIG. 3 forms (prints) an image with the ink-jet printing unit 53 while maintaining the tension of the indirect transfer medium 20 constant using the indirect transfer medium conveying shafts 54 and the tension control shaft 62.

Consequently, as illustrated in FIG. 8, the image is formed with ink supplied by the ink-jet printing unit 53 on the ink-image receiving layer 12 of the indirect transfer medium 20 and is retained thereon.

The controller 70 subsequently rotates the conveying rollers 60A of the transfer-target medium conveying unit 60 and causes the transfer target medium 56 in a sheet form or a booklet form (for example, a passbook and a passport) to move up to and stop at a transfer start position.

The controller 70 then conveys the indirect transfer medium 20, on which printing has been finished, via the indirect transfer medium conveying shafts 54 until a printed portion reaches the transfer start position, and stops the indirect transfer medium 20. In this case, the time duration until when the image formed on the indirect transfer medium 20 (image forming surface) is made in contact with other members including the tension control shaft 62 is set to be greater than or equal to 10 and less than or equal to 30 seconds, and is controlled such that the dry condition is met before the indirect transfer medium 20 makes contact with other members including the tension control shaft 62.

Figure 9:
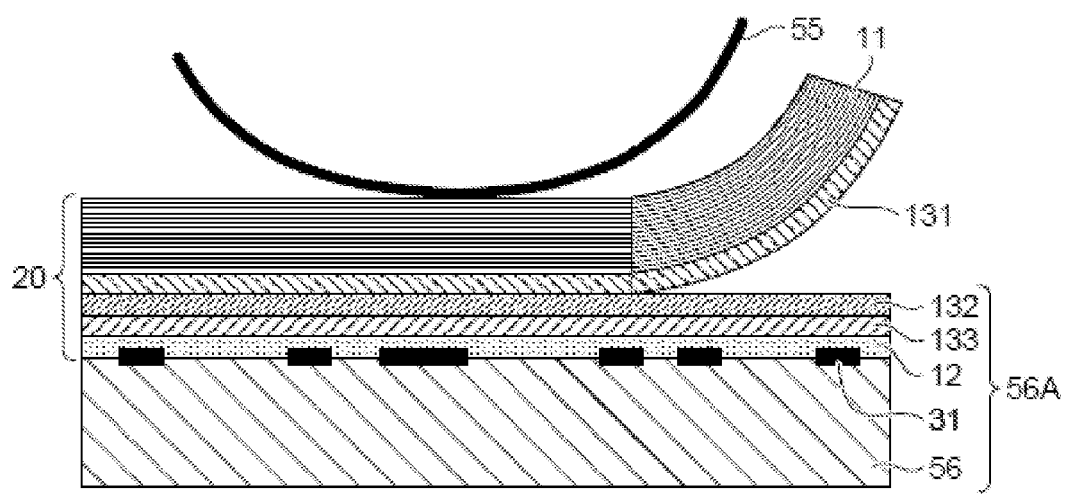
FIG. 9 is a diagram for explaining the transfer of the indirect transfer medium and the operation during the transfer in the second embodiment.

FIG. 9 is a diagram for explaining the transfer of the indirect transfer medium and the operation during the transfer in the second embodiment.

The controller 70 heats up the heat roller 55. The controller 70 then rotates the rotating arm 55B around the rotational shaft 55A as the center of rotation with the drive mechanism not illustrated, to move the heat roller 55 such that the indirect transfer medium 20 is pressed against the transfer target medium 56 by the heat roller 55.

Under the condition in which the indirect transfer medium 20 is pressed against the transfer target medium 56 by the heat roller 55, the controller 70 rotates the conveying rollers 60A of the transfer-target medium conveying unit 60 to apply heat (100 to 180° C.) by the heat roller 55 to the whole transfer target area. As a result, as illustrated in FIG. 9, the indirect transfer medium 20 is transferred onto the transfer target medium 56.

The controller 70 then further rotates the conveying rollers 60A of the transfer-target medium conveying unit 60. Upon the rotation of the conveying rollers 60A, the controller 70 stops the rotation of the indirect transfer medium roll 51 and the base-material collecting roll 57. Consequently, the controller 70 discharges the forgery prevention medium 56A while peeling off the peel-off layer 131 and the base material 11 of the indirect transfer medium 20.

The controller 70 then rotates the base-material collecting roll 57 to collect the base material 11 and the peel-off layer 131 after the transfer and peel-off.

The above-described process produces the forgery prevention medium 56A with the indirect transfer medium 20 (except for the base material 11 and the peel-off layer 131) transferred onto the transfer target surface thereof.

As in the foregoing, the indirect transfer medium 20 in the second embodiment enables forming of an image of high image quality without ink bleeding along fibers even when printing is performed by ink-jet printing.

Furthermore, because the indirect transfer medium 20 is fast-dry, the forgery prevention medium 56A is produced at low cost and in a short period of time even when an ink-jet printer and a transfer device that performs transfer are integrally configured as a forgery prevention medium producing apparatus.

Moreover, the forgery prevention medium obtained by transferring (thermocompression bonding) the indirect transfer medium 20 onto the transfer target medium 56 has superior image quality.

When the indirect transfer medium 20 is formed in a roll form, printing and transferring can be performed continuously, whereby the effective production speed of the forgery prevention medium 56A is improved, and thus work efficiency is improved.

While the second embodiment describes the case in which the base material 11 and the peel-off layer 131 are peeled off at the boundary surface between the peel-off layer 131 and the protective layer 132, the place of peeling may be the boundary surface between the base material 11 and the peel-off layer 131, or the peel-off layer 131 can be partially peeled off to remain on both the base material 11 and the peel-off layer 131. More specifically, as long as there are no defects on all of the protective layer 132, the optical layer 133, the ink-image receiving layer 12, ink 31, and the transfer target medium 56, the place of peeling can be anywhere.

First Modification

Figure 10:
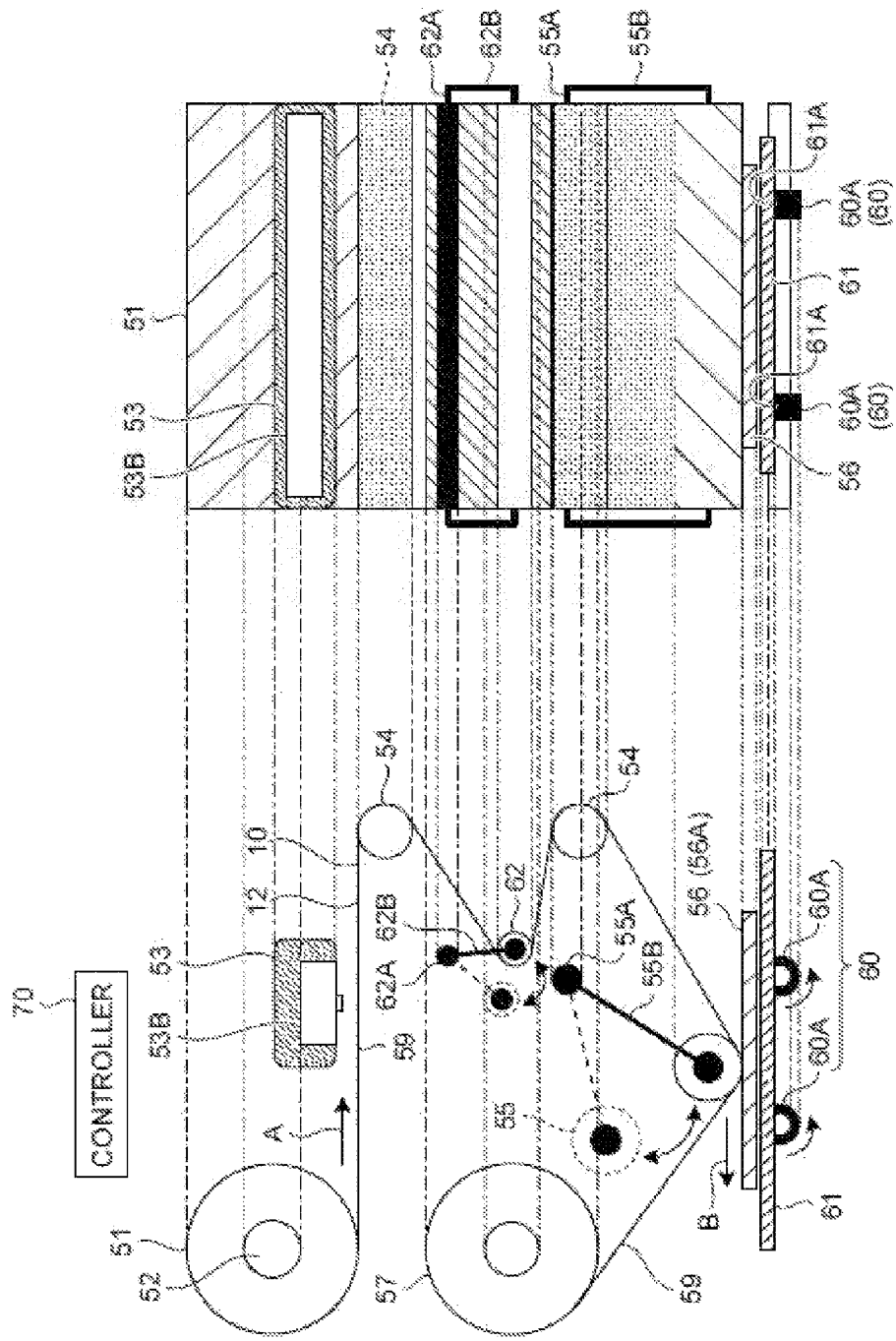
FIG. 10 is a schematic diagram illustrating a configuration of a forgery prevention medium producing apparatus according to a first modification of embodiments.

FIG. 10 is a schematic diagram illustrating a configuration of a forgery prevention medium producing apparatus according to a first modification of embodiment(s).

In the forgery prevention medium producing apparatus 50 in the above description, the ink-jet head 53A of the ink-jet printing unit 53 is configured to be driven by the scanning motor not illustrated, which is driven under the control of the controller 70, and to be scanned in the sub-scanning direction orthogonal to the main-scanning direction, which is the conveying direction of the indirect transfer medium 10, along an operation guide shaft not depicted.

However, as illustrated in FIG. 10, a line ink-jet head 53B as an ink-jet head can perform printing for one line in one go.

This configuration can simplify the configuration of the apparatus because a mechanism for scanning the ink-jet head is not needed and improve the image forming speed, whereby a forgery prevention medium can be produced at a higher speed.

Second Modification

Figure 11:
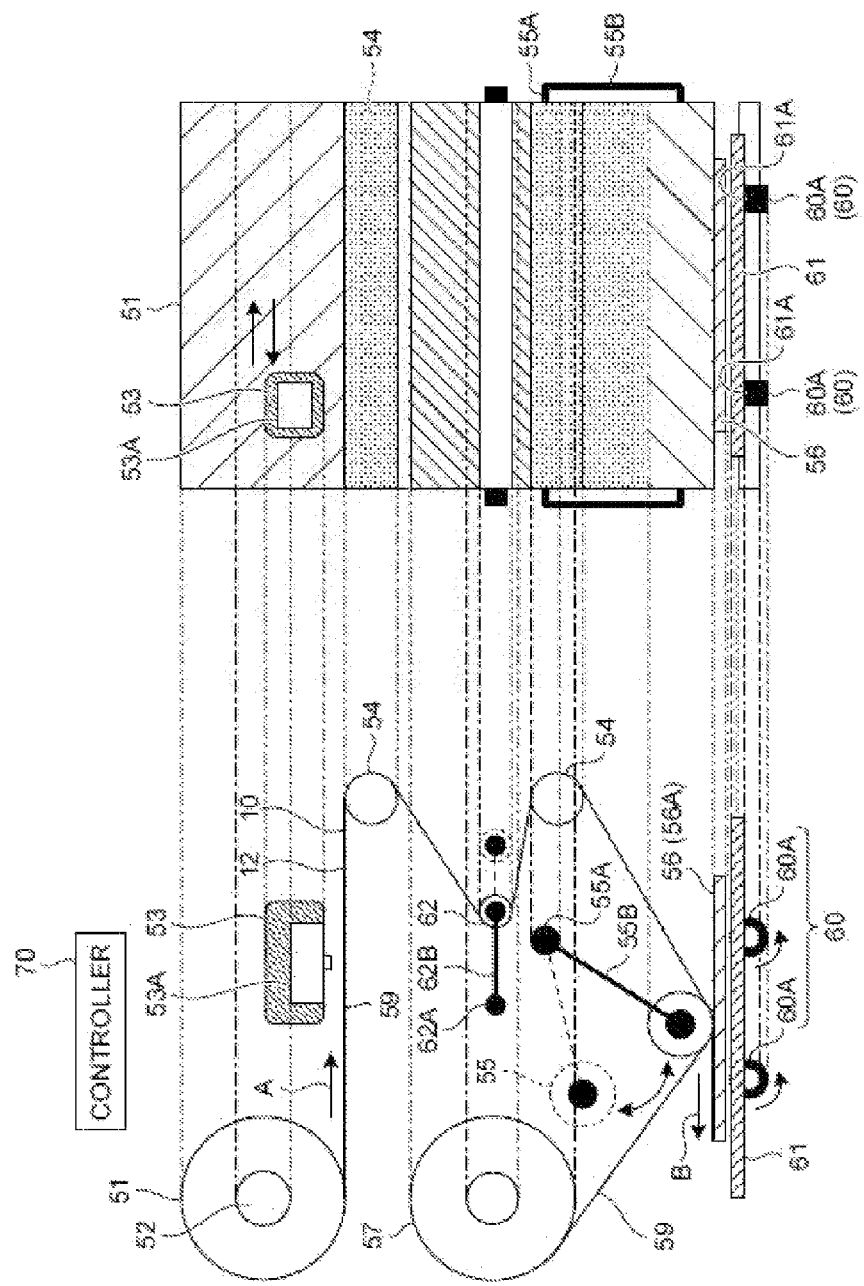
FIG. 11 is a schematic diagram illustrating a configuration of a forgery prevention medium producing apparatus according to a second modification of embodiments.

FIG. 11 is a schematic diagram illustrating a configuration of a forgery prevention medium producing apparatus according to a second modification of embodiment(s).

In the above description, the controller 70 is configured to maintain the tension (tensile force) of the indirect transfer medium constant during conveyance with the tension control shaft 62 by rotating the rotating arm 62B around the rotational shaft 62A as the center of rotation with the drive mechanism not depicted. In contrast, the second modification is configured to maintain the tension (tensile force) of the indirect transfer medium constant during conveyance not by rotating the tension control shaft 62 but by driving it linearly with a biasing member such as a spring.

Consequently, the mounting space for the tension control shaft 62 can be made small, and eventually, downsizing of the forgery prevention medium producing apparatus can be achieved.

Third Modification

Figure 12:
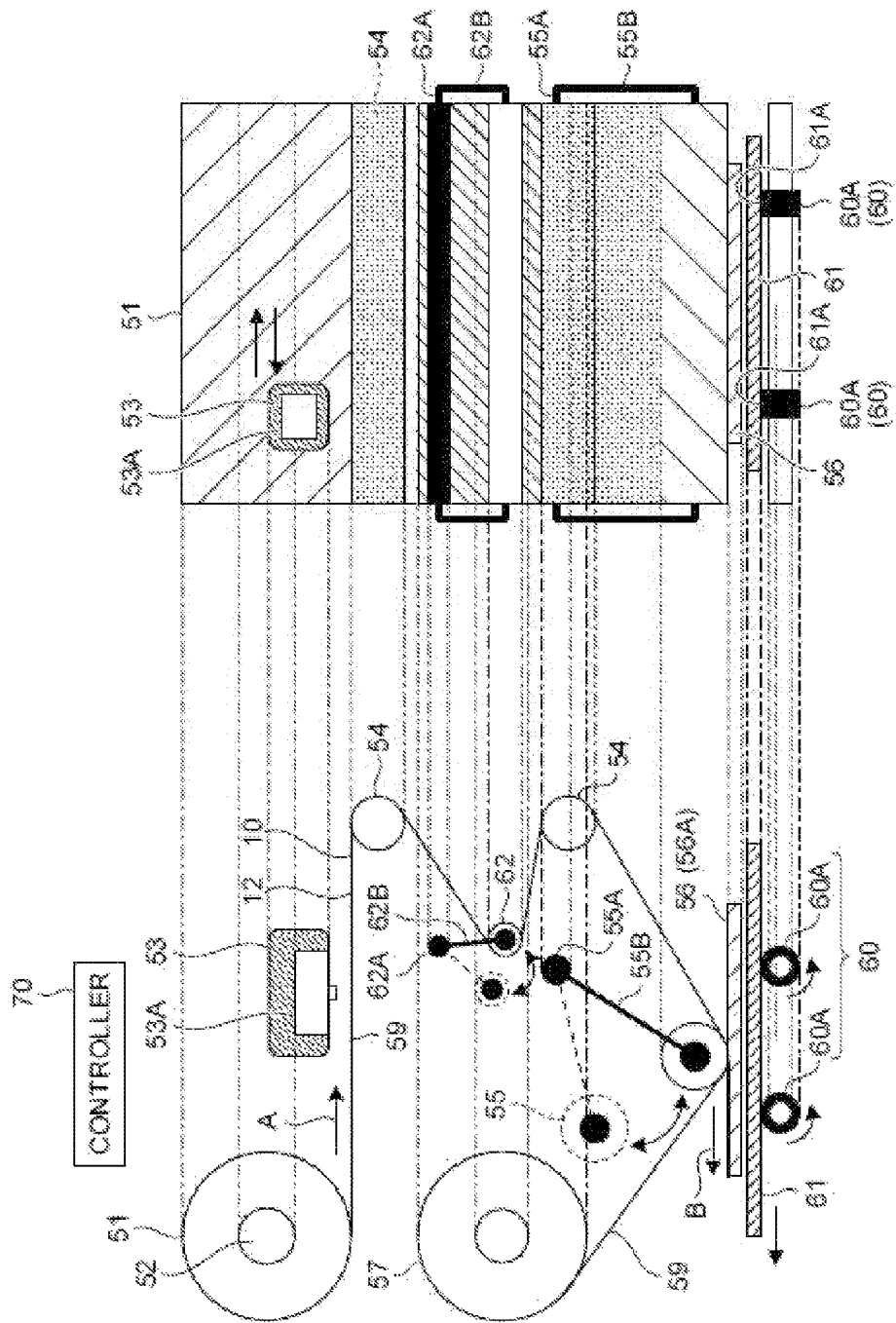
FIG. 12 is a schematic diagram illustrating a configuration of a forgery prevention medium producing apparatus according to a third modification of embodiments.

FIG. 12 is a schematic diagram illustrating a configuration of a forgery prevention medium producing apparatus according to a third modification of embodiment(s).

In the above description, it is configured that the transfer target medium 56, which is a transfer target medium, is conveyed on a fixed conveying path configured as the thermocompression-bonding smoothing plate 61 by the conveying rollers 60A.

As for the conveying method of the transfer target medium 56, however, the mechanism only needs to move the indirect transfer medium 10 or 20 and the transfer target medium 56 in a coordinated manner. For example, as illustrated in FIG. 12, it is possible to adopt a configuration in which the thermocompression-bonding smoothing plate 61 itself is moved by the conveying rollers 60A.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Example

A more specific example will be described.

The present example is an example corresponding to the first embodiment.

In the present example, a resin mixture constituting the ink-image receiving layer 12 is obtained at the following compounding ratios:

Water-absorbent resin: modified polyester resin, 70%
Additive (surfactant): polyoxyalkylene lauryl ether, 1%
Cationic resin: cationic vinyl compound copolymer, 9%
Thermoplastic resin: vinyl acetate maleate copolymer, 20%.

The polyoxyalkylene lauryl ether as an additive is added to improve wettability of when coating is performed.

The foregoing materials are sufficiently kneaded to obtain a material to form the ink-image receiving layer 12, and then uniformly applied (coating) onto a 25 μm thick polyethylene terephthalate film base material as the base material 11 using, for example, a bar coater.

By drying it in an oven at 100° C. for 10 minutes, the indirect transfer medium 10 with a film thickness of 33 μm is obtained (the layer thickness of the ink-image receiving layer 12 was 8 μm).

On the indirect transfer medium 10 of this example, solid printing was made with an ink amount of 1.3 ml (milliliters) on an area of 1 cm2. In 10 seconds, it turned into the dry condition under which the ink is not transferred onto copying paper (made by Fuji Xerox) even when a load of 70 g/cm$^2$ was applied.

An image dot formed with 6 pl of ink had a diameter of 42±2 μm.

The roundness of the image dot formed was 2 μm, and thus mixing the above-described materials of the water-absorbent resin, the cationic resin, and the thermoplastic resin (vinyl acetate maleate copolymer) at the foregoing compounding ratios can form an image dot close to a true circle stably.

Moreover, through thermocompression bonding of the image forming surface (printing surface) of the ink-image receiving layer 12 as an adhering surface at greater than or equal to 100° C., more preferably at greater than or equal to 150° C. and less than or equal to 180° C., the ink-image receiving layer 12 adheres to a paper medium.

The base material 11 is not limited to a polyethylene terephthalate film, and as long as it is a film that transmits at least the light of a wavelength from 300 to 900 nm (nanometers) (near-ultraviolet rays, visible light, and near-infrared rays), the material thereof is not specifically limited.

The present example provides a fast-dry ink-jet indirect transfer medium, which can contribute to improvement in work efficiency (such as reduction of processing time) and provide superior image quality in the indirect transfer medium and eventually in the forgery-proof medium.

What is claimed is:

1. An indirect transfer medium comprising:
   a base material; and
   an image receiving layer on which an image is capable of being formed by ink-jet printing, the image receiving layer including a vinyl acetate maleate copolymer as thermo-adhesive material, the image receiving layer being laminated on the base material, wherein
   the base material serves as an overcoat layer upon adhesion of the indirect transfer medium onto a transfer target medium, and
   the base material is formed by an ultraviolet curable resin.

2. The indirect transfer medium according to claim 1, wherein the image receiving layer includes a water-absorbent resin and a cationic resin.

3. The indirect transfer medium according to claim 2, wherein
   the water-absorbent resin includes a denatured polyester, and the cationic resin includes a cationic vinyl compound.

4. The indirect transfer medium according to claim 3, wherein the image receiving layer is compounded at 10% to 40% by weight of the vinyl acetate maleate copolymer, 5% to 10% by weight of the cationic vinyl compound, and 55% to 80% by weight of the denatured polyester.

5. The indirect transfer medium according to claim 1, further comprising a functional layer with a predetermined function, wherein the functional layer is provided between the base material and the image receiving layer.

6. The indirect transfer medium according to claim 5, wherein the functional layer includes at least one of a peel-off layer for peeling off the base material, an optical layer that improves optical characteristics, and a protective layer that protects the image receiving layer.

7. A forgery prevention medium producing apparatus comprising:
   a first conveying unit that conveys the indirect transfer medium according to claim 1;
   an ink-jet image forming unit that forms an image by ink-jet printing on the indirect transfer medium that is being conveyed by the first conveying unit;
   a second conveying unit that conveys a transfer target medium; and
   a thermal transfer unit that bonds the indirect transfer medium on which the image is formed and being conveyed by the first conveying unit onto the transfer target medium that is being conveyed by the second conveying unit, so as to transfer the indirect transfer medium onto the transfer target medium.

8. The forgery prevention medium producing apparatus according to claim 7, wherein the first conveying unit conveys the indirect transfer medium to a position at which the transfer is performed within 30 seconds after the image is formed by the ink-jet image forming unit.

9. The forgery prevention medium producing apparatus according to claim 7, wherein the first conveying unit conveys the indirect transfer medium so that a time for a surface of the indirect transfer medium, on which the image is formed by the ink-jet image forming unit, to contact another object is greater than or equal to 10 seconds and less than or equal to 30 seconds.

\* \* \* \* \*